United States Patent
Moennig

Patent Number: 5,956,812
Date of Patent: Sep. 28, 1999

[54] EYEGLASS HOLDER

[76] Inventor: January L. Moennig, 1201 Bay Pine Blvd., Indian Rocks Beach, Fla. 33785

[21] Appl. No.: 09/007,451

[22] Filed: Jan. 15, 1998

[51] Int. Cl.[6] ............................. A44B 21/00; G02C 11/00
[52] U.S. Cl. ................................ 24/3.3; 24/3.13; 24/301; 351/157
[58] Field of Search ............................. 24/3.3, 3.1, 3.13, 24/301, 302; 351/156, 157, 112

[56] References Cited

U.S. PATENT DOCUMENTS

| | | | |
|---|---|---|---|
| 1,896,029 | 1/1933 | Gunther | 24/3.13 |
| 2,126,379 | 8/1938 | Fischer | 24/232 |
| 3,397,026 | 8/1968 | Spina | 351/157 |
| 3,827,790 | 8/1974 | Wenizel | 24/3.3 |
| 4,771,515 | 9/1988 | Guarro | 24/3 C |
| 4,809,406 | 3/1989 | Tsai | 24/3 C |
| 4,894,887 | 1/1990 | Ward, II | 24/3 C |
| 4,965,913 | 10/1990 | Sugarman | 24/301 |
| 5,351,098 | 9/1994 | McDaniels et al. | 351/112 |
| 5,408,728 | 4/1995 | Wisniewski | 24/3 R |
| 5,414,906 | 5/1995 | Kren | 24/3.3 |
| 5,459,903 | 10/1995 | Treacy | 24/301 |
| 5,465,466 | 11/1995 | Napier | 24/3.3 |
| 5,611,118 | 3/1997 | Bibbee | 24/298 |
| 5,615,454 | 4/1997 | Contarino | 24/3.13 |
| 5,654,787 | 8/1997 | Barison | 351/157 |
| 5,655,264 | 8/1997 | Davancens et al. | 24/3.3 |

FOREIGN PATENT DOCUMENTS 2191932  12/1987  United Kingdom ............. 351/157

Primary Examiner—Victor N. Sakran
Attorney, Agent, or Firm—Dennis G. LaPointe; Mason & Assciates, P.A.

[57] ABSTRACT

An eyeglass holder secures a pair of eyeglasses to a selected article of clothing when the eyeglasses are not being worn. The holder comprises a flexible strand folded back upon itself forming a loop to encircle and releasably hold the eyeglass temple bar. An adjusting sleeve allows size adjustment of the loop. A retention bead engages the loop to prevent the adjusting sleeve from sliding off the loop. The loop is connected to a spring loaded clamp having teeth releasably clamped to the selected article of clothing.

8 Claims, 1 Drawing Sheet

EYEGLASS HOLDER

BACKGROUND OF THE INVENTION

The present invention relates generally to eyeglass holders, and pertains, more specifically, to an eyeglass holder to secure a pair of eyeglasses to a selected article of clothing when the eyeglasses are not being worn.

When they are not being worn, eyeglasses are usually stored in a case and carried in a pocket or purse. It often happens that the eyeglasses are to be placed on and removed frequently during the day, or changed with another pair. In this event, the eyeglasses should be more conveniently accessible for rapid and easy changes. Eyeglasses carried in a pocket without a case can be scratched, or fall out of the pocket to be lost or broken.

Eyeglass holders are known and, heretofore, have been configured in different ways. Some examples of eyeglass holders in the prior art are seen in the following U.S. patents:

Sugarman, U.S. Pat. No. 4,965,913; Wenzel, U.S. Pat. No. 3,827,790; and Davancens, et al, U.S. Pat. No. 5,655,264; all disclose a neck strap with a loop or end fastener at each end for holding the temple bars. Upon removing the eyeglasses, they remain open and hanging about the neck, swinging wildly during physical activity. This restricts the wearer's activity, distracts attention, and subjects the eyeglasses to possible damage. Changing to a different pair of eyeglasses is inconvenient.

Tsai, U.S. Pat. No. 4,809,406, shows eyeglasses held by a belt and buckle connected to a spring loaded clip for attachment to clothing. The device uses many parts requiring complex assembly.

Ward, II, U.S. Pat. No. 4,894,887, depicts a molded clip integral with a loop to receive a temple bar. The loop does not clasp the temple bar, hence the eyeglasses can rattle and possibly fall out. The clip cannot be placed anywhere on the clothing, but must be installed vertically downward. Being of molded polymeric material, it is subject to creep fatigue, wherein the clip will relax it's grip on the clothing.

McDaniels, et al, U.S. Pat. No. 5,351,098, illustrates a molded pocket engaging clip integral with an eyeglass retaining clamp. This holder can only be used in a pocket, wherein the clamp would be difficult to operate. The polymeric clip may not grip the pocket securely.

Wisniewski, U.S. Pat. No. 5,408,728, discloses a molded pocket engaging clip pivotally attached to a molded eyeglass holding clip. The holder cannot be attached anywhere to clothing, but must be installed vertically downward. It is polymeric, and may not grip clothing securely. Both temple bars are inserted into one clip, and one temple bar is inserted into another clip, a maneuver requiring dexterity and both hands.

Kren, U.S. Pat. No. 5,414,906, shows two clothing engaging spring clips mounted to a tubular member into which a temple bar is inserted. The device entails many parts and complex assembly. It is meant to be worn on the eyeglasses, which may be aesthetically unacceptable. The clips exhibit questionable clamping ability.

Accordingly, there is a need to provide an eyeglass holder that functions quickly and easily.

A further need is to provide an eyeglass holder of the type described and that attaches securely to both the eyeglasses and the clothing, so that the eyeglasses will not swing about or fall off during physical activity.

A yet further need is to provide an eyeglass holder of the type described and that can be attached anywhere on the clothing, and in any position, and with one hand.

A still further need is to provide an eyeglass holder of the type described and that can be manufactured cost effectively in large numbers of high quality.

An additional need is to provide an eyeglass holder of the type described and that is simple in design and rugged in construction to ensure reliable operation and long life.

SUMMARY OF THE INVENTION

The above features, as well as further features and advantages are attained by the present invention which may be described briefly as an eyeglass holder to secure a pair of eyeglasses to a selected article of clothing when the eyeglasses are not being worn, the eyeglasses including a temple bar, the eyeglass holder comprising: a temple bar loop including a flexible strand having opposite ends, the strand folded back upon itself forming an annular portion, the opposite ends brought together forming a paired, elongated portion coextensive from the annular portion to a terminus; a clamp connected to the elongated portion terminus, the clamp releasably clamped to the selected article of clothing; an adjusting sleeve slideably engaging the temple bar loop elongated portion closely adjacent the annular portion, the adjusting sleeve and the annular portion forming a retention loop, the adjusting sleeve allowing size adjustment of the retention loop so that the retention loop will encircle and releasably hold the temple bar, whereby the eyeglasses will be secured to the selected article of clothing when the eyeglasses are not being worn; retention means, including an enlargement of the annular portion of the temple bar loop, for retention of the adjusting sleeve on the temple bar loop; and a flexible sleeve covering the clamp so as to prevent hair from entangling the clamp.

BRIEF DESCRIPTION OF THE DRAWING

The invention will be more fully understood, while still further features and advantages will become apparent, in the following detailed description of the preferred embodiment thereof illustrated in the accompanying drawing, in which.

DESCRIPTION OF THE PREFERRED EMBODIMENT

Figure 1:
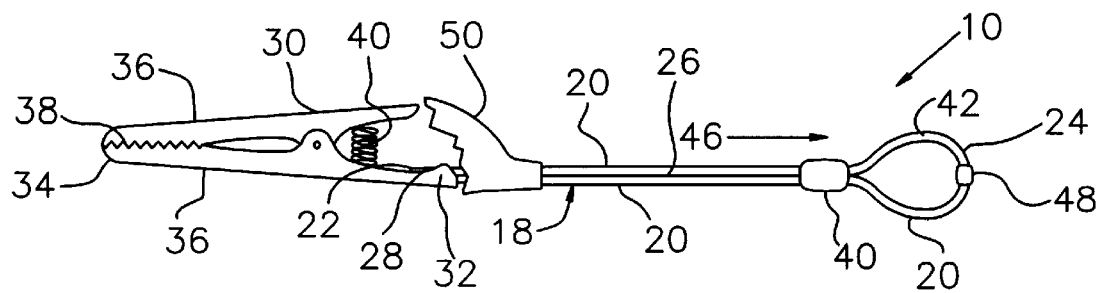
FIG. 1 is a side elevational view of an eyeglass holder constructed in accordance with the invention, with the flexible sleeve partly cut away, showing the clamp, and showing the adjusting sleeve moved toward the annular portion to close the retention loop.

Referring now to the drawing, an eyeglass holder, shown at 10, is used to secure a pair of eyeglasses 12 to a selected article of clothing, in this example a shirt collar 16, when the eyeglasses 12 are not being worn. The eyeglasses 12 include a temple bar 14. The eyeglass holder 10 comprises a temple bar loop 18 including a flexible strand 20 having opposite ends 22. The strand 20 is folded back upon itself forming an annular portion 24. The opposite ends 22 are brought together forming a paired, elongated portion 26 coextensive from the annular portion 24 to a terminus 28.

Figure 3:
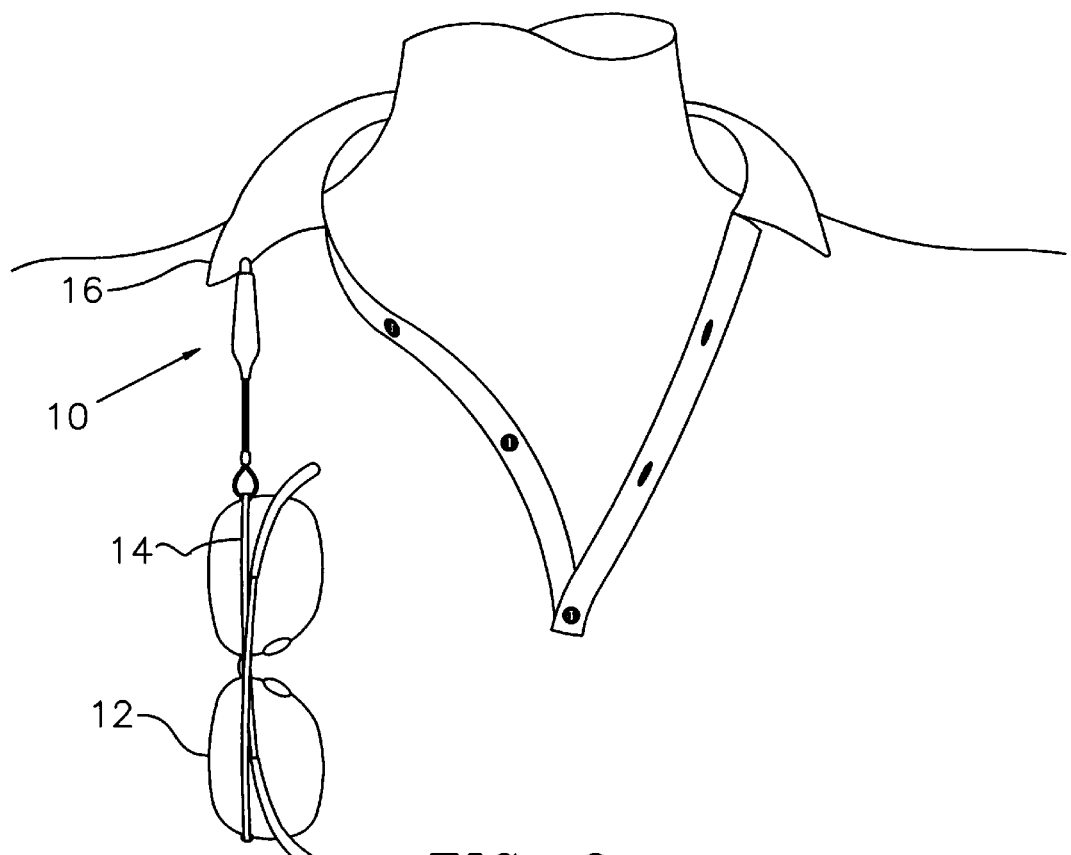
FIG. 3 is a front elevational view of a person using the eyeglass holder of FIG. 1 to secure a pair of eyeglasses to a shirt collar.

A clamp 30 is provided, having a first end 32 crimp connected to the elongated portion terminus 28. The clamp 30 includes pair of opposed jaws 36 coextensive toward a second end 34. The jaws 36 are spring biased toward one another by a spring 40. The jaws 36 have mutually engaging teeth 38 releasably clamped to the selected article of clothing 16, as shown in FIG. 3. This type of clamp is commonly referred to as an alligator clip. A flexible sleeve 50 is installed covering the clamp 30 so as to prevent hair from entangling the clamp 30.

An adjusting sleeve 40 is provided, comprising an elongated bead having a hole therethrough longitudinally. The adjusting sleeve 40 slideably engages the temple bar loop elongated portion 26 closely adjacent the annular portion 24. The adjusting sleeve 40 and the annular portion 24 form a retention loop 42. The adjusting sleeve 40 allows size adjustment of the retention loop 42 so that the retention loop 42 will encircle and releasably hold the temple bar 14.

Figure 2:
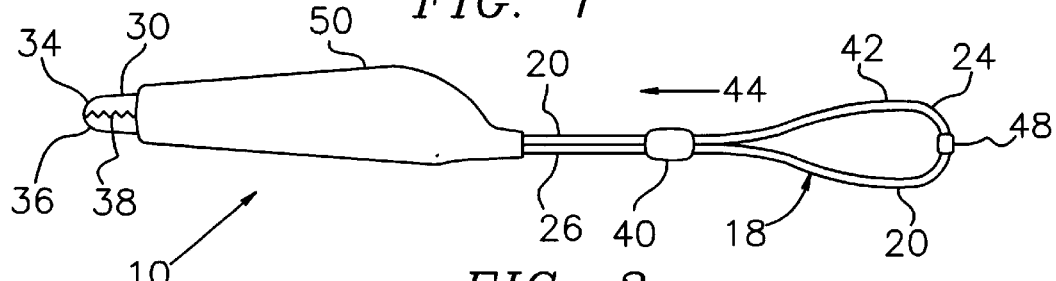
FIG. 2 is a side elevational view of the eyeglass holder of FIG. 1, showing the adjusting sleeve moved away from the annular portion to open the retention loop.

The eyeglasses 12 are installed on the holder 10 by sliding the adjusting sleeve 40 toward the clamp 30, as shown by arrow 44 in FIG. 2, to open up the retention loop 42. The temple bar 14 is inserted into the retention loop 42. The adjusting sleeve 40 is then slid away from the clamp 30, and toward the annular portion 24, to close the retention loop 42 around the temple bar 14. The clamp 30 is then clamped onto any convenient seam or fold of clothing, such as a collar, a pocket (with the eyeglasses inside or outside of the pocket), a neck opening, a front closure seam, etc. The clamp can be positioned in any direction: upward, downward or sideways. In this manner the eyeglasses will be secured to the selected article of clothing when the eyeglasses are not being worn.

A retention sleeve 48 is provided, comprising a bead having a hole therethrough. The retention sleeve 48 engages the annular portion 24 of the temple bar loop 18 to prevent the adjusting sleeve 40 from sliding off the temple bar loop 18.

As seen from the foregoing description, the present invention satisfies the need to provide an eyeglass holder that grips the eyeglasses firmly, attaches the eyeglasses securely to any article of clothing, can be installed in any position, will not swing about or rattle distractingly, is accessible quickly and easily, and is simple and rugged.

It is to be understood that the above detailed description of an embodiment of the invention is provided by way of example only. Various details of design and construction may be modified without departing from the true spirit and scope of the invention as set forth in the appended claims.

The embodiments of the invention in which an exclusive property or privilege is claimed are defined as follows:

1. An eyeglass holder for securing a pair of eyeglasses suspended from a temple bar included with the eyeglasses to a selected article of clothing when the eyeglasses are not being worn, the eyeglass holder comprising:

a temple bar loop including a flexible strand having opposite ends, the strand folded back upon itself forming an annular portion, the opposite ends brought together forming a paired, elongated portion coextensive from the annular portion to a terminus;

a clamp connected to the elongated portion terminus, the clamp releasably clamped to the selected article of clothing; and an adjusting sleeve slideably engaging the temple bar loop elongated portion closely adjacent the annular portion, the adjusting sleeve and the annular portion forming a retention loop, the adjusting sleeve allowing size adjustment of the retention loop so that the retention loop will encircle and releasably hold the temple bar, whereby the eyeglasses will be secured to the selected article of clothing when the eyeglasses are not being worn.

2. The invention of claim 1, further comprising retention means for retention of the adjusting sleeve on the temple bar loop.

3. The invention of claim 2, wherein the clamp includes a pair of opposed, coextensive jaws biased toward one another.

4. The invention of claim 3, wherein the adjusting sleeve comprises a bead having a hole therethrough.

5. The invention of claim 4, wherein the means for retention includes an enlargement of the annular portion of the temple bar loop.

6. The invention of claim 4, wherein the means for retention includes a retention sleeve comprising a bead having a hole therethrough, engaging the annular portion of the temple bar loop.

7. The invention of claim 6, further comprising a flexible sleeve covering the clamp so as to prevent hair from entangling the clamp.

8. An eyeglass holder to secure a pair of eyeglasses to a selected article of clothing when the eyeglasses are not being worn, the eyeglasses including a temple bar, the eyeglass holder comprising:

a. a temple bar loop including a flexible strand having opposite ends, the strand folded back upon itself forming an annular portion, the opposite ends brought together forming a paired, elongated portion coextensive from the annular portion to a terminus;

b. a clamp having a first end crimp connected to the elongated portion terminus, the clamp including pair of opposed jaws coextensive toward a second end, the jaws being spring biased toward one another, the jaws having mutually engaging teeth releasably clamped to the selected article of clothing;

c. an adjusting sleeve comprising an elongated bead having a hole therethrough longitudinally, slideably engaging the temple bar loop elongated portion closely adjacent the annular portion, the adjusting sleeve and the annular portion forming a retention loop, the adjusting sleeve allowing size adjustment of the retention loop so that the retention loop will encircle and releasably hold the temple bar, whereby the eyeglasses will be secured to the selected article of clothing when the eyeglasses are not being worn;

d. a retention sleeve comprising a bead having a hole therethrough, engaging the annular portion of the temple bar loop to prevent the adjusting sleeve from sliding off the temple bar loop; and e. a flexible sleeve covering the clamp so as to prevent hair from entangling the clamp.

* * * * *